US012801632B2

(12) United States Patent
Guo et al.

(10) Patent No.: US 12,801,632 B2
(45) Date of Patent: *Nov. 17, 2026

(54) UTILIZING ASYNCHRONOUS DOUBLE-WRITES TO MIGRATE DATA BETWEEN DATABASES

(71) Applicant: Chime Financial, Inc., San Francisco, CA (US)

(72) Inventors: Jiaqi Guo, Spring, TX (US); Valentina Josefina Trujillo Di Base, Vancouver (CA); Shigeki Hirose, Des Moines, WA (US)

(73) Assignee: Chime Financial, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/982,511

(22) Filed: Dec. 16, 2024

(65) Prior Publication Data

US 2025/0190448 A1 Jun. 12, 2025

Related U.S. Application Data

(63) Continuation of application No. 18/499,467, filed on Nov. 1, 2023, now Pat. No. 12,169,506.

(51) Int. Cl.
*G06F 16/27* (2019.01)

(52) U.S. Cl.
CPC ............ *G06F 16/273* (2019.01); *G06F 16/27* (2019.01)

(58) Field of Classification Search
None
See application file for complete search history.

(56) References Cited

U.S. PATENT DOCUMENTS

2005/0216524 A1 9/2005 Gomes et al.
2010/0191884 A1 7/2010 Holestein et al.
(Continued)

FOREIGN PATENT DOCUMENTS

WO WO-2023227921 A1 * 11/2023 ........... G06F 16/214

OTHER PUBLICATIONS

Bussler, Christoph, "Online Database Migration by Dual-Write: This is not for Everyone (to be more precise: for almost no-one)", Medium blog post, published Jun. 23, 2020, 50 pages. (Year: 2020).*

(Continued)

*Primary Examiner* — Scott A. Waldron
(74) *Attorney, Agent, or Firm* — Nicholson De Vos Webster & Elliott LLP

(57) ABSTRACT

The present disclosure relates to systems, non-transitory computer-readable media, and methods for utilizing asynchronous double-writes to migrate data from a primary database to a secondary database. In particular, in one or more embodiments, the disclosed systems, upon receiving a work unit, write data to a primary database and generate a trigger to asynchronously write, by a sync record service, the data to a secondary database. In some embodiments, the disclosed systems reverse the direction of the asynchronous double-writes so that, upon receiving additional work units, the disclosed systems write, by the sync record service, additional data to the secondary database and generate a trigger to asynchronously write additional data to the primary database.

20 Claims, 12 Drawing Sheets

(56) References Cited

U.S. PATENT DOCUMENTS

| | | | |
|---|---|---|---|
| 2017/0075921 A1 | 3/2017 | Benton et al. | |
| 2018/0260149 A1 | 9/2018 | Zhou | |
| 2019/0306010 A1 | 10/2019 | Medam et al. | |
| 2020/0409914 A1* | 12/2020 | Nadimpalli | G06F 16/214 |

OTHER PUBLICATIONS

U.S. Appl. No. 18/499,467, Sep. 27, 2024, Notice of Allowance.

* cited by examiner

UTILIZING ASYNCHRONOUS DOUBLE-WRITES TO MIGRATE DATA BETWEEN DATABASES

CROSS-REFERENCE TO RELATED APPLICATIONS

The present application is a continuation of U.S. application Ser. No. 18/499,467, filed on Nov. 1, 2023. The aforementioned application is hereby incorporated by reference in its entirety.

BACKGROUND

Recent years have seen significant improvements in databases for storing digital information to recall during processing and computing. For example, conventional systems utilize databases for storing, maintaining, and accessing data used in various aspects of running computing systems. In particular, as different functions and features are added to systems, databases increase in size and storage requirements and require migration or copying of data to other databases to organize data and mitigate potential failure points.

Although conventional systems can migrate data between databases, such systems have a number of problems in relation to accuracy, efficiency, and flexibility of operation. For instance, conventional systems are inflexible because they are unable to migrate data between different types of databases. Specifically, due to the complexity and interconnected nature of databases, conventional systems utilize heavily tailored migration procedures for a specific database and corresponding database service. Indeed, conventional systems are often so heavily tailored for a certain database migration that they cannot replicate the data migration for migrating other similar databases.

Due at least in part to their inflexibility, conventional systems are also inefficient. For instance, because conventional systems customize data migration to work with a specific database service, conventional systems require tremendous amounts of computing resources to fit a database migration to an existing database. Specifically, since conventional systems must be heavily tailored for large-scale database migrations, each database migration requires massive amounts of computer processing and running time in order to customize a migration procedure each time a database needs to be migrated.

In addition, conventional systems are inaccurate as migrated databases are often unable to accurately recall information once the database information is migrated to another database. Specifically, conventional systems often fail to migrate foreign key relationships between databases and/or database tables, and so after migration, when databases are used to recall information, they are unable to do so because the foreign key relationship is no longer intact. Moreover, even if conventional systems attempt to migrate foreign key relationships, foreign key relationships are often complex and link to several different databases or database tables, which conventional systems fail to maintain accurately and also result in databases that break down when used to recall data. These, along with additional problems and issues, exist with regard to conventional systems.

BRIEF SUMMARY

Embodiments of the present disclosure provide benefits and/or solve one or more of the foregoing or other problems in the art with systems, non-transitory computer-readable media, and methods for migrating data by utilizing asynchronous double-writes to write data from a primary database to a secondary database. For example, the disclosed systems, upon receiving a work unit, write data to a primary database and generate a trigger to asynchronously write the data to a secondary database. The disclosed systems can also change the direction of asynchronous double-writes to a reversed direction so that, upon receiving an additional work unit, the disclosed systems write additional data to the secondary database and generate a trigger to asynchronously write the additional data to the primary database. Additional features and advantages of one or more embodiments of the present disclosure are outlined in the description which follows and, in part, will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
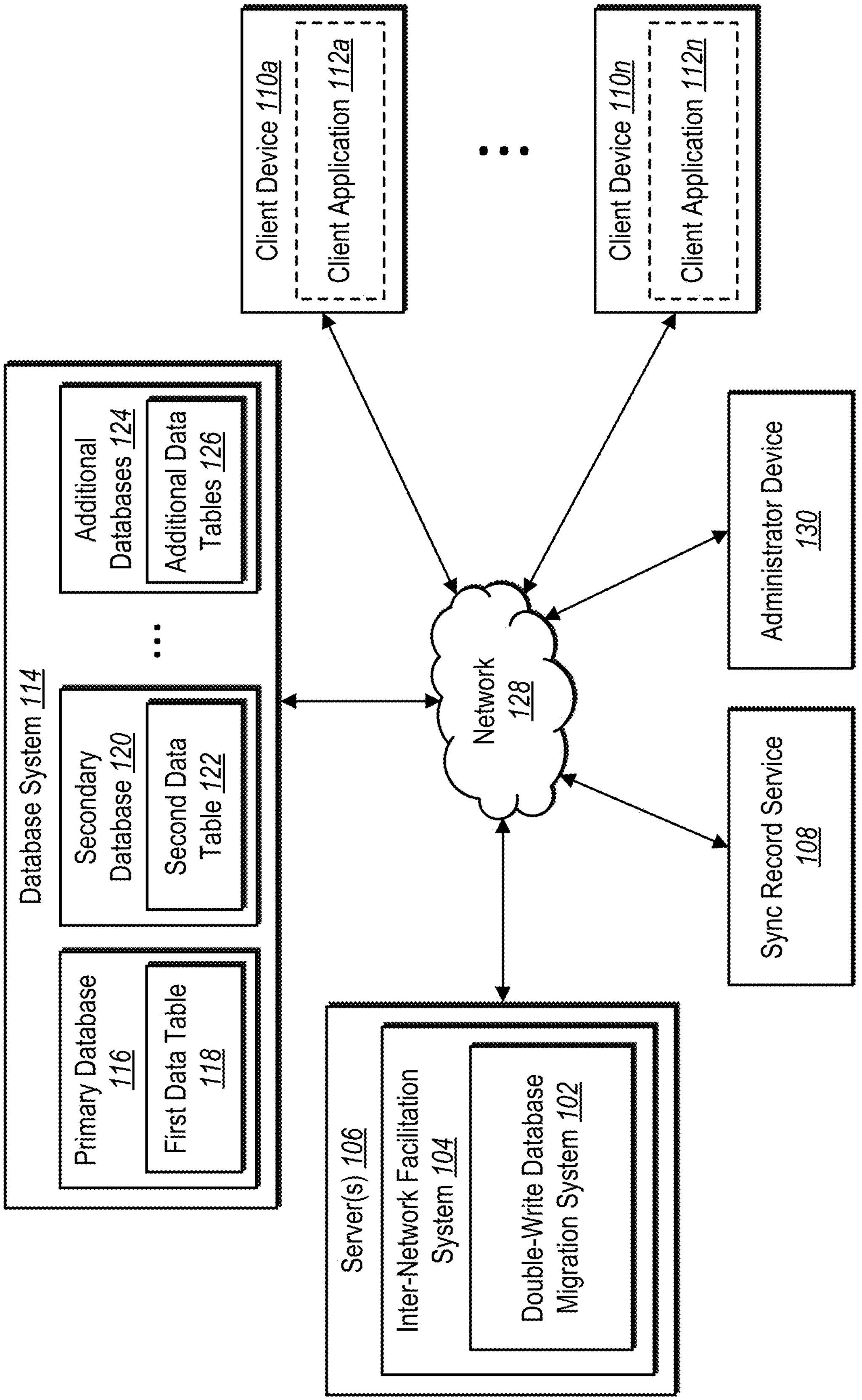
FIG. 1 illustrates a diagram of an environment in which a double-write database migration system can operate in accordance with one or more embodiments.

This disclosure describes one or more embodiments of a double-write database migration system that migrates data between databases by asynchronously double-writing data in a primary database and a second database. To elaborate, the double-write database migration system can receive a work unit that writes data to a primary database and, based on an initial sync direction, generates a trigger to schedule an asynchronous write of the data to a secondary database with a sync record service. The double-write database migration system can also change the sync direction to a reversed sync direction so that, upon receiving an additional work unit, the double-write database migration system writes data to the secondary database and generates a trigger to schedule, with the sync record service, an asynchronous write of the additional data to the primary database. In some embodiments, the double-write database migration system determines whether to write data to the secondary database (or to the primary database if the sync direction is reversed) based on a timestamp associated with the data. In addition, if the double-write database migration system identifies errors with the secondary database (e.g., when using the secondary database to recall data), the double-write database migration system can change the sync direction for the first client device back to the initial sync direction.

As mentioned, in some embodiments, the double-write database migration system determines whether to write data based on a timestamp associated with the data. For example, the double-write database migration system can determine that a unit of data in a primary database is a newest version of the unit of data before writing the unit of data to the secondary database. As another example, the double-write database migration system can use a timestamp to identify that a unit of data in the primary database is an older version of the unit of data and determine not to write the unit of data to the secondary database. Moreover, the double-write database migration system can wait a threshold amount of time and, upon identifying that an updated timestamp reflects that a unit of data is an updated version, write the unit of data to the secondary database.

In some embodiments, the double-write database migration system changes the sync direction for a client device or set of client devices. For example, the double-write database migration system can change the sync direction to a reversed sync direction for a client device so that when the double-write database migration system receives work units from that client device, it will generate a write command to the secondary database and schedules an asynchronous write command to the primary database. Moreover, the double-write database migration system can maintain the initial sync direction for other client devices so that work units received from the other client devices will generate write commands to the primary database and schedule asynchronous write commands to the secondary database. In one or more embodiments, the double-write database migration system changes the sync direction for a client device based on a client identification.

Further, the double-write database migration system can manage the timing of changing the sync direction. For example, the double-write database migration system can change the sync direction based on receiving an instruction to change to the reversed sync direction (e.g., by populating it through various servers). As another example, the double-write database migration system can reverse the sync direction based on receiving an instruction to change the sync direction at a specified time. In one or more embodiments, the double-write database migration system utilizes a switch to change the sync direction to a reversed sync direction.

The double-write database migration system provides a variety of technical advantages relative to conventional systems. For example, the double-write database migration system improves flexibility relative to conventional systems by migrating data between different database services. Specifically, because the double-write database migration system utilizes a sync record service to asynchronously write data to a secondary database without changing code related to the database schema, the double-write database migration system can migrate data between databases that utilize different services. Moreover, the double-write database migration system can migrate data between different database services without requiring additional preparation of the primary database (e.g., the database currently holding the data) or the secondary database (e.g., the database to which the double-write database migration system is migrating the data).

In addition to improving flexibility, because the double-write database migration system can migrate data between different database services, the double-write database migration system also improves efficiency relative to conventional systems. Specifically, by utilizing a sync record service to asynchronously write data to a secondary database without requiring changes to code or additional preparation, the double-write database migration system requires significantly less processing time and computing power than conventional systems. Indeed, because the double-write database migration system does not require the heavy tailoring required by conventional systems, the double-write database migration system substantially decreases the amount of processing time needed to migrate data between databases.

Moreover, the double-write database migration system also improves accuracy relative to conventional systems because there are no foreign key relations to other databases that are not part of a given data migration. Specifically, unlike conventional systems that often break down when used to recall data due to inaccurate foreign key relationships, the double-write database migration system utilizes a sync record service to asynchronously write data to a secondary database without foreign key relation to the primary database (e.g., the existing database). Moreover, because the double-write database migration system migrates data without foreign key relations to databases that are not part of the migration, the double-write database migration system can migrate portions of a database (e.g., a selection of data tables from the database) that will accurately be able to recall information.

As illustrated by the foregoing discussion, the present disclosure utilizes a variety of terms to describe features and advantages of the double-write database migration system. Additional detail is now provided regarding the meaning of such terms. For example, as used herein, the term "work unit" refers to a database transaction that encapsulates one or more operations in a database. In particular, the term "work unit" refers to actions that result in a change in the content of a database. To illustrate, a work unit can include reading a database object, writing to the database, acquiring, or releasing a lock. As another illustration, an application can generate a work unit that tracks interactions or various changes made as a client device interacts with an application.

Further, as used herein, the term "trigger" refers to an action or set of actions that are executed in response to an operation or event. In particular, the term "trigger" can include actions that are executed when an opening occurs in response to a delete, insert, or update in a database. To illustrate, a trigger can include scheduling an asynchronous write command with a sync record service when a database receives a work unit. In one or more embodiments, a trigger comprises an after-commit callback that works after detecting a creation, updating, or destroying of a database record and after a database system commits the database record.

In addition, as used herein, the term "sync record service" refers to an application, service, processing system, sidekick, or worker that asynchronously writes data to a secondary database. In particular, the term "sync record" can include a worker that will asynchronously write data scheduled by a trigger in response to receiving a work unit. To illustrate, a sync record service can include an application, service, process, or other worker that is coded or otherwise instructed in how to asynchronously sync data from a primary database to a secondary database (e.g., by copying the data from the primary database and writing it to the secondary database).

Moreover, as used herein, the term "sync direction" refers to the direction in which data is synced between databases. In particular, the term "sync direction" can include identifying a database from which to copy data and a database to write the copied data. In some embodiments, an initial sync direction refers to a direction that is identified or established at the onset of a data migration. For example, an initial sync direction can comprise copying from a primary database and writing to a secondary database. In other embodiments, a reversed sync direction refers to changing a sync direction to a direction that is reversed from an initial sync direction. For example, a reversed sync direction can comprise changing an initial sync direction to a reversed sync direction that involves copying from the secondary database and writing to a secondary database.

Additional detail regarding the double-write database migration system will now be provided with reference to the figures. In particular, FIG. 1 illustrates a block diagram of a system environment for implementing a double-write database migration system 102 in accordance with one or more embodiments. As shown in FIG. 1, the environment includes server(s) 106 housing the double-write database migration system 102 as part of the inter-network facilitation system 104. The environment of FIG. 1 further includes sync record service 108, client device(s) 110*a*-110*n* that can optionally house client applications 112*a*-112*n*, and a database system 114 that comprises a primary database 116 with a first data table 118, a secondary database 120 with a second data table 122, and additional databases 124 with additional data tables 126. The server(s) 106 can include one or more computing devices to implement the double-write database migration system 102. Additional description regarding the illustrated computing devices (e.g., the server(s) 106, sync record service 108, client device(s) 110*a*-110*n*, and database system 114) is provided with respect to FIGS. 10-11 below.

As shown, the double-write database migration system 102 utilizes the network 128 to communicate with the sync record service 108, client device(s) 110*a*-110*n*, and database system 114. The network 128 may comprise any network described in relation to FIGS. 10-11 below. For example, the double-write database migration system 102 communicates with the database system 114 and/or the sync record service 108 to provide and receive information pertaining to asynchronously writing data between databases. Indeed, the inter-network facilitation system 104 or the double-write database migration system 102 can store data in the database system 114 (e.g., by designating a database to store data). Moreover, the double-write database migration system 102 and/or the inter-network facilitation system can also receive data from client device(s) 110*a*-110*n* that can be stored in database system 114.

As also shown, the environment includes database system 114, which hosts a plurality of databases, and each database has a plurality of data tables. As shown, the database system 114 hosts primary database 116 with first data table 118 and secondary database 120 with secondary database 120. Database system 114 also includes additional databases 124 with additional data tables 126 that indicate additional databases and data tables.

To migrate data between databases by asynchronously writing data, in some cases, the double-write database migration system 102 or the inter-network facilitation system 104 communicates with the database system 114 and the sync record service 108. More specifically, the inter-network facilitation system or the double-write database migration system 102 identifies a change in database system 114 and utilizes sync record service 108 to schedule an asynchronous write command of a unit of data to a different database in database system 114. For example, the double-write database migration system 102 or the inter-network facilitation system 104 receive a work unit that generates a write command to first data table 118 in primary database 116, which generates a trigger to schedule, with sync record service 108, an asynchronous write command of the unit of data to second data table 122 in secondary database 120.

As indicated by FIG. 1, the client device(s) 110*a*-110*n* optionally include client application(s) 112*a*-112*n*. In some embodiments, the inter-network facilitation system 104 or the double-write database migration system 102 communicates with client device(s) 110*a*-110*n* to, for example, receive and provide information related to a user account associated with a client device 110*a*-110*n*. In one or more embodiments, data related to a user account is stored as part of the database system 114.

As also indicated by FIG. 1, the environment includes an administrator device 130. In some embodiments, the inter-network facilitation system 104 or the double-write database migration system 102 communicates with the administrator device 130 to receive and provide information related to administering the inter-network facilitation system 104 or the double-write database migration system 102. In some embodiments, the double-write database migration system 102 receives a reverse sync direction command from administrator device 130.

Although FIG. 1 illustrates the environment having a particular number and arrangement of components associated with the double-write database migration system 102, in some embodiments, the environment may include more or fewer components with varying configurations. For example, in some embodiments, the inter-network facilitation system 104 or the double-write database migration system 102 can communicate directly with the sync record service 108, client device(s) 110*a*-110*n*, client application(s) 112*a*-112*n*, and/or database system 114, bypassing the network 128. In these or other embodiments, the inter-network facilitation system 104 or the double-write database migration system 102 can be housed (entirely on in part) on the client device(s) 110*a*-110*n*.

Figure 2:
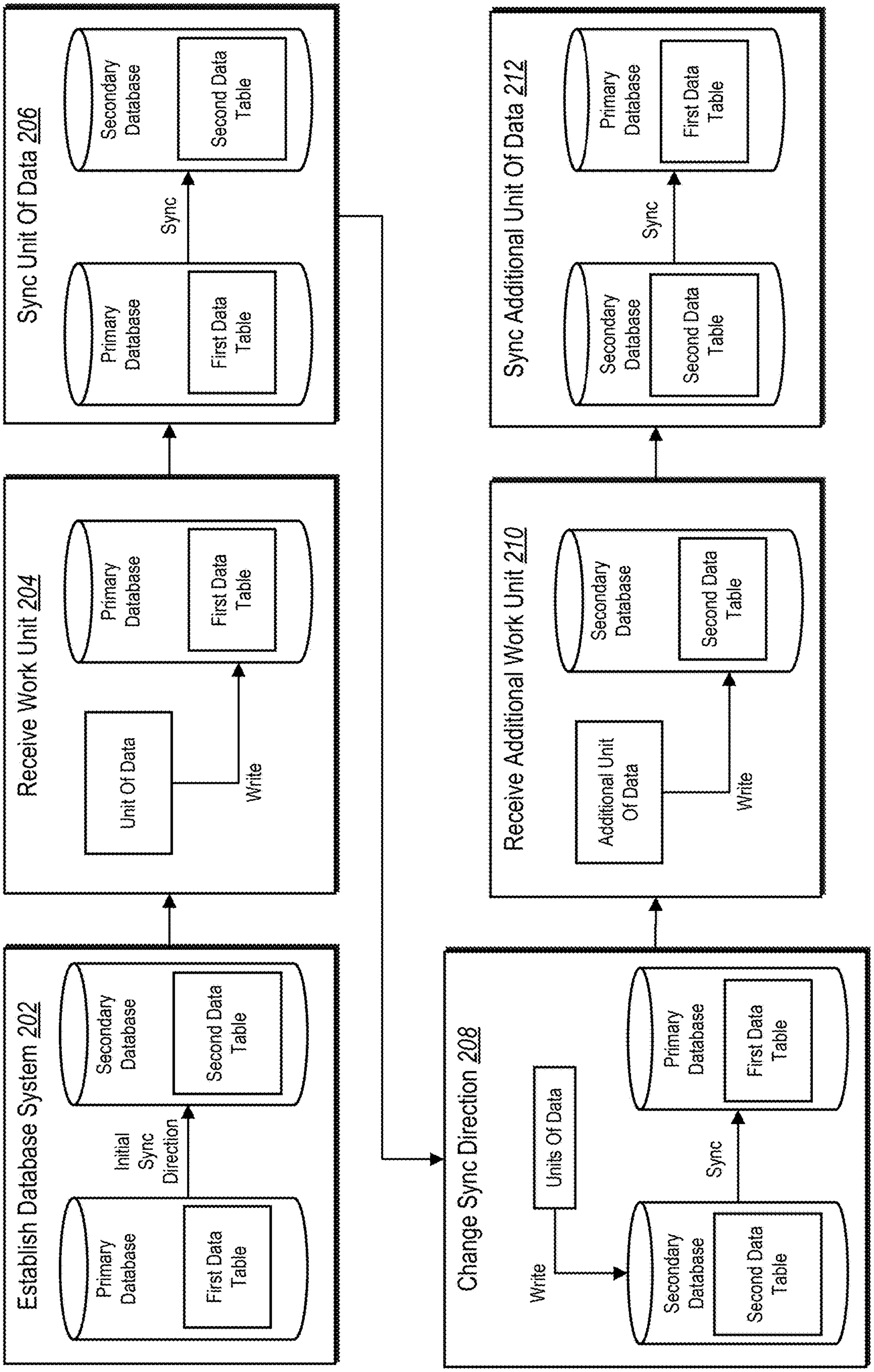
FIG. 2 illustrates an example sequence flow of a double-write database migration system in accordance with one or more embodiments.

As mentioned, the double-write database migration system 102 can migrate data from a primary database to a secondary database using asynchronous double-writes. In particular, the double-write database migration system 102 can utilize a sync record service to asynchronously write a unit of data from a primary database to a secondary database. FIG. 2 illustrates an overview of a sequence for asynchronously writing data and changing the sync direction. Thereafter, the description of subsequent figures provides additional detail regarding specific acts or components of migrating data by utilizing a sync record worker to asynchronously write data from a primary database to a secondary database and reversing sync directions.

As shown in FIG. 2, the double-write database migration system 102 performs an act 202 to establish a database system. In particular, the double-write database migration system 102 establishes a database system (e.g., database system 114) that comprises a primary database (e.g., primary database 116) that hosts a plurality of data tables (e.g., first data table 118 and additional data tables) and a secondary database (e.g., secondary database 120) that also hosts a plurality of data tables (e.g., second data table 122 and additional data tables). Moreover, the database system can comprise or designate an initial sync direction denoting a direction in which data syncs between the databases. For example, the database system can comprise an initial sync direction between the first data table in the primary database and a second data table in the secondary database.

As further illustrated in FIG. 2, the double-write database migration system 102 performs an act 204 and receives a work unit. In particular, the double-write database migration system 102 receives a work unit that generates a write command of a unit of data to the first data table in the primary database. Moreover, receiving the work unit generates a trigger to schedule, with a sync record service, and based on the initial sync direction, an asynchronous write command of the unit of data to the second data table in the secondary database.

Moreover, as illustrated in FIG. 2, the double-write database migration system 102 performs an act 206 and syncs the unit of data. In particular, the double-write database migration system 102 syncs the unit of data by writing, by the sync record service, the unit of data to the second data table in the secondary database based on the scheduled asynchronous write command and the initial sync direction. For example, the double-write database migration system 102 writes the unit of data to the secondary database by copying the unit of data from the first data table in the primary database and writing it to the second data table in the secondary database.

In some embodiments, the double-write database migration system 102 determines whether to write the unit of data to the secondary database based on a timestamp associated with the unit of data. For example, the double-write database migration system 102 can determine, based on timestamp, that the unit of data in the primary database is not a newest version of the unit of data and either determines not to write the unit of data or to wait a threshold amount of time and checking the timestamp again to determine whether the unit of data. If, after the threshold amount of time, the double-write database migration system 102 determines that the unit of data is an updated version, the double-write database migration system 102 can then write, by the sync record service, the unit of data to the second data table in the secondary database.

As also illustrated in FIG. 2, the double-write database migration system 102 performs an act 208 and changes the sync direction. In particular, the double-write database migration system 102 changes the sync direction by changing the initial sync direction to a reversed sync direction based on receiving a reverse sync direction command. For example, after changing the sync direction to a reversed sync direction, when the double-write database migration system 102 writes a unit of data to the second data table in the secondary database and schedules an asynchronous write command to sync the unit of data to the first data table in the primary database. In one or more embodiments, the double-write database migration system 102 changes the sync direction to a reversed sync direction for a client device associated with a user identification while maintaining the initial sync direction for other client devices associated with other user identifications.

Furthermore, as illustrated in FIG. 2, the double-write database migration system 102 performs an act 210 and receives an additional work unit. In particular, the double-write database migration system 102 receives an additional work unit that generates an additional write command of an additional unit of data to the second data table in the secondary database. Moreover, receiving the additional work unit generates an additional trigger to schedule, with the sync record service and based on the reversed sync direction, an asynchronous write command of the additional unit of data to the first data table in the primary database.

Additionally, as illustrated in FIG. 2, the double-write database migration system 102 performs an act 212 and syncs the additional unit of data. In particular, the double-write database migration system 102 syncs the additional unit of data by writing, utilizing the sync record service and based on the scheduled asynchronous write command, the additional unit of data to the first data table in the primary database. In one or more embodiments, the double-write database migration system 102 can identify an error with the secondary database based on utilizing the secondary database to recall data and changing the sync direction again from the reversed sync direction back to the initial sync direction. In other embodiments, the double-write database migration system 102 can modify the database system by removing a command to generate triggers to schedule, with the sync record service, asynchronous write commands when receiving work units. In these cases, the double-write database migration system 102, upon receiving further work units, writes to the specified database (e.g., does not sync to an additional database).

Figure 3A:
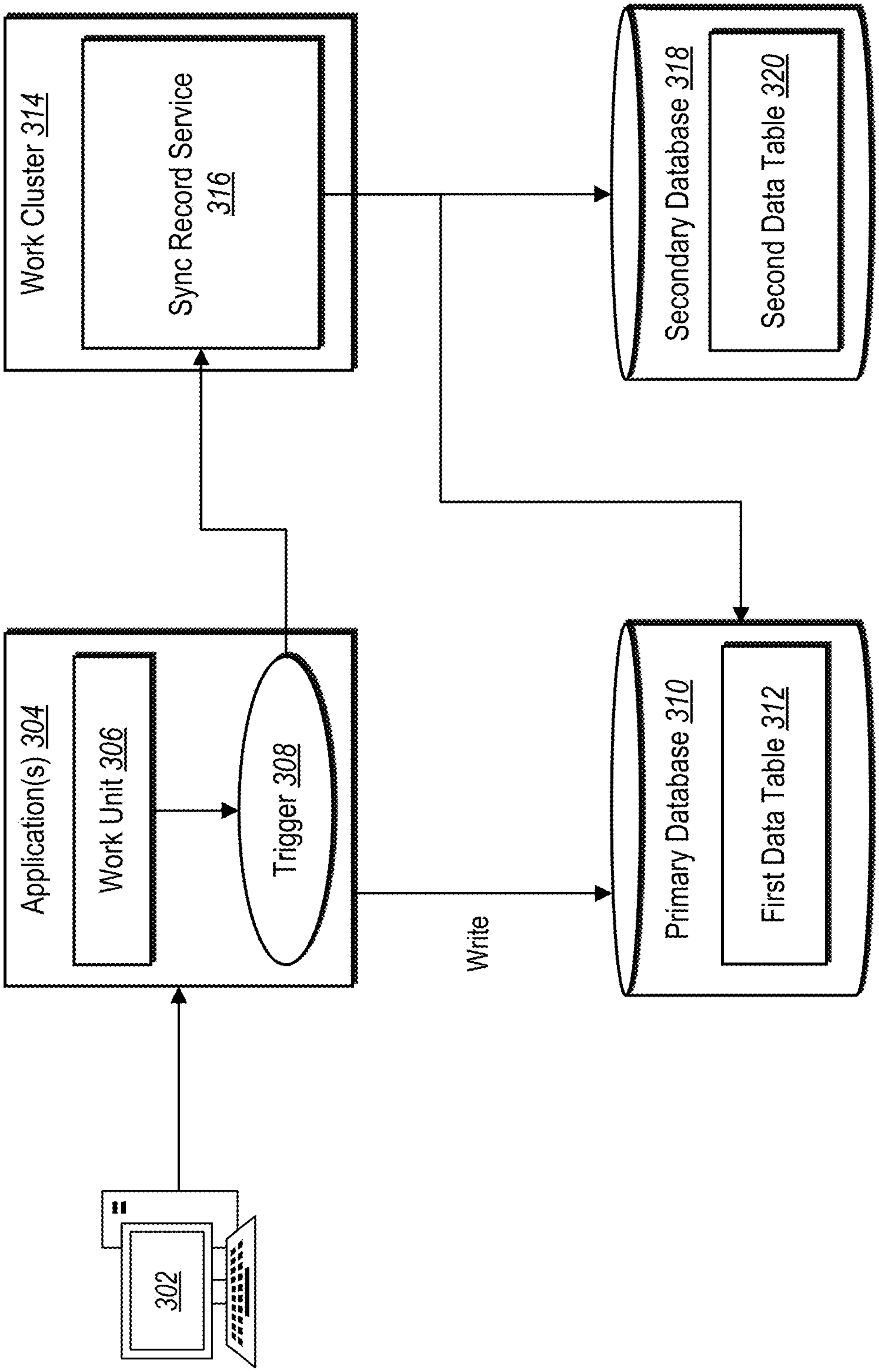
FIGS. 3A-3B illustrate example diagrams of a double-write database migration system utilizing a sync record service to write data based on sync direction in accordance with one or more embodiments.
Figure 3B:
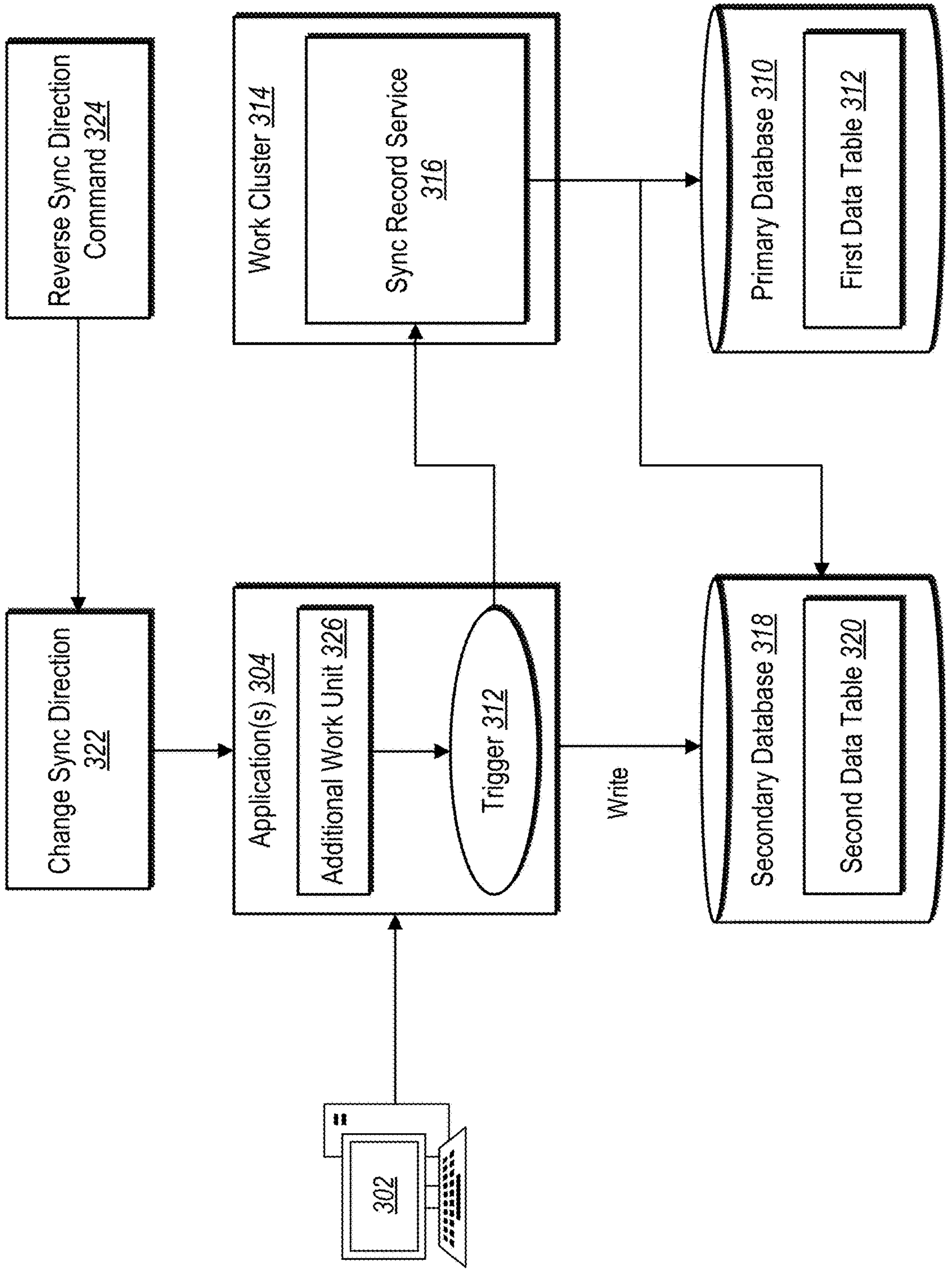

As previously mentioned, the double-write database migration system 102 utilizes a sync record service to asynchronously write data in a database. In particular, the sync record service can write data based on sync direction, such as an initial sync direction or reversed sync direction. FIG. 3A-3B illustrates an example diagram of the double-write database migration system 102 utilizing a sync record service to asynchronously write data based on sync direction. Specifically, FIG. 3A illustrates the double-write database migration system 102 utilizing a sync record service to asynchronously write data in an initial sync direction. FIG. 3B illustrates an example diagram of the double-write database migration system 102 receiving a reverse sync direction command and using a sync record service to asynchronously write data in a reversed sync direction.

As illustrated in FIG. 3A, the double-write database migration system 102 receives data from a client device 302 in application(s) 304. In particular, the double-write database migration system 102 receives or identifies an interaction from client device 302 in application(s) 304 that generates a work unit 306. For example, work unit 306 can track interactions or changes made when client device 302 interacts with application(s) 304. To illustrate, client device 302 can interact with application(s) 304 of the inter-network facilitation system (e.g., to make a transaction), which generates the work unit 306.

In one or more embodiments, the double-write database migration system 102 receives work unit 306. In particular, when the double-write database migration system 102 receives work unit 306 that generates a write command of a unit of data to a first data table 312 in the primary database 310, where the unit of data reflects the interactions or changes comprised in the work unit. For example, the double-write database migration system 102 can write the unit of data in a form that corresponds to the database schema that corresponds to the primary database. To illustrate, if the primary database is a relational database, the double-write database migration system 102 can write a unit of data as a record (e.g., a row) that can be further organized as part of the table.

Further, in some embodiments, receiving the work unit 306 generates a trigger 308 that prompts an asynchronous write command. In particular, receiving the work unit 306 generates a trigger 308 to schedule, with sync record service 316, an asynchronous write command of the unit of data to second data table 320 in secondary database 318. For example, trigger 308 can comprise an after-commit callback that identifies that the double-write database migration system 102 received the work unit (e.g., after creating, updating, or destroying a database record and after the database system commits the database record) and schedules the asynchronous write command of the unit of data to the second data table in the secondary database.

As shown, in one or more embodiments, the sync record service 316 is part of a worker cluster 314. In particular, a worker cluster 314 can include one or more workers that share the same server port and run simultaneously. For example, a worker cluster can comprise a collection of workers or services that perform a process. To illustrate, the sync record service 316 can be a portion of a larger process by the worker cluster 314 that assists the double-write database migration system 102 in writing data from a primary database to a secondary database.

As mentioned, the sync record service 316 writes the unit of data to the secondary database. In particular, the sync record service 316 can sync the unit data by copying the unit of data from the primary database and writing it to the second database. For example, the sync record service 316 can copy the unit of data from first data table 312 in primary database 310 and write the unit of data to second data table 320 in secondary database 318. In some embodiments, the sync record service 316 writes the unit of data by writing data at a scheduled time specified in the asynchronous write command. In other embodiments, the sync record service 316 can sync data based on a timestamp of work unit 306 or data associated with work unit 306. More detail regarding the sync record service 316 utilizing a timestamp to asynchronously write data is given in regard to FIG. 5 below.

As also previously mentioned, the double-write database migration system 102 can change the sync direction. FIG. 3B illustrates an example diagram of the double-write database migration system 102 receiving a reverse sync direction command and using a sync record service to asynchronously write data in a reversed sync direction.

As shown in FIG. 3B, the double-write database migration system 102 can receive a reverse sync direction command 324. In particular, the double-write database migration system 102 can receive a reverse sync direction command 324 that instructs the double-write database migration system 102 to change the sync direction 322. For example, the double-write database migration system 102 can receive reverse sync direction command 324 from an administrator device comprising instructions to change the sync direction from an initial sync direction to a reversed sync direction. To illustrate, when in the initial sync direction, the double-write database migration system 102 can generate a write command of a unit of data to a primary database and sync to the secondary database. Moreover, when in the reversed sync direction, the double-write database migration system 102 can write to the secondary database and sync to the secondary database.

In some embodiments, the double-write database migration system 102 changes sync direction 322 by changing the sync direction from an initial sync direction to a reversed sync direction. In particular, reverse sync direction command 324 can comprise instructions that indicate a selection of a database (or a specific data table in a database) for the double-write database migration system 102 to write and a database (or a specific data table in a database) for the double-write database migration system 102 to sync. For example, reverse sync direction command 324 can comprise instructions that instruct the double-write database migration system 102 to generate a write command to the database and/or data table specified in reverse sync direction command 324 and sync to the database and/or data table specified in reverse sync direction command 324 when receiving a work unit. As illustrated in FIG. 3B, the double-write database migration system 102 receives a reverse sync direction command 324 and changes sync direction 322 so that, upon receiving additional work units, the double-write database migration system 102 will generate a write command to second data table 320 in secondary database 318 and sync to first data table 312 in primary database 310.

In addition, in one or more embodiments, when the double-write database migration system 102 receives additional work units, the double-write database migration system 102 generates an additional trigger to schedule, with sync record service 316, an additional asynchronous write command of an additional unit of data. As shown in FIG. 3B, the double-write database migration system 102 receives additional work unit 326, which generates a write command of an additional unit of data to second data table 320 in secondary database 318 and generates an additional trigger 328 to sync the unit of data by scheduling, with sync record service 316, an additional asynchronous write command of the additional unit of data to first data table 312 in primary database 310.

In some embodiments, the double-write database migration system 102 changes sync direction 322 for a client device or set of client devices while maintaining the sync direction for other client devices. In particular, the double-write database migration system 102 receives reverse sync direction command 324 that comprises instructions to change the sync direction 322 to a reverse sync direction for the client device. For example, after changing the sync direction and upon receiving a work unit from the client device, the double-write database migration system 102 generates a write command of a unit of data to second data table 320 in secondary database 318 and sync, through the sync record service, the unit of data by asynchronously writing the unit of data to first data table 312 in primary database 310. Moreover, upon receiving work units received from other client devices, the double-write database migration system 102 will generate write commands to first data table 312 in primary database 310 and sync, through the sync record service, the unit of data to second data table 320 in secondary database 318.

In addition, in one or more embodiments, the double-write database migration system 102 changes the sync direction for a client device based on client identification. In particular, the double-write database migration system 102 receives reverse sync direction command 324 that comprises instructions to change the sync direction to a reversed sync direction based on a client identification. For example, reverse sync direction command 324 can comprise instructions that indicate changes made on a client device associated with the specified client identification (e.g., a client login) will be synced to the database system in the reversed sync direction.

Figure 4:
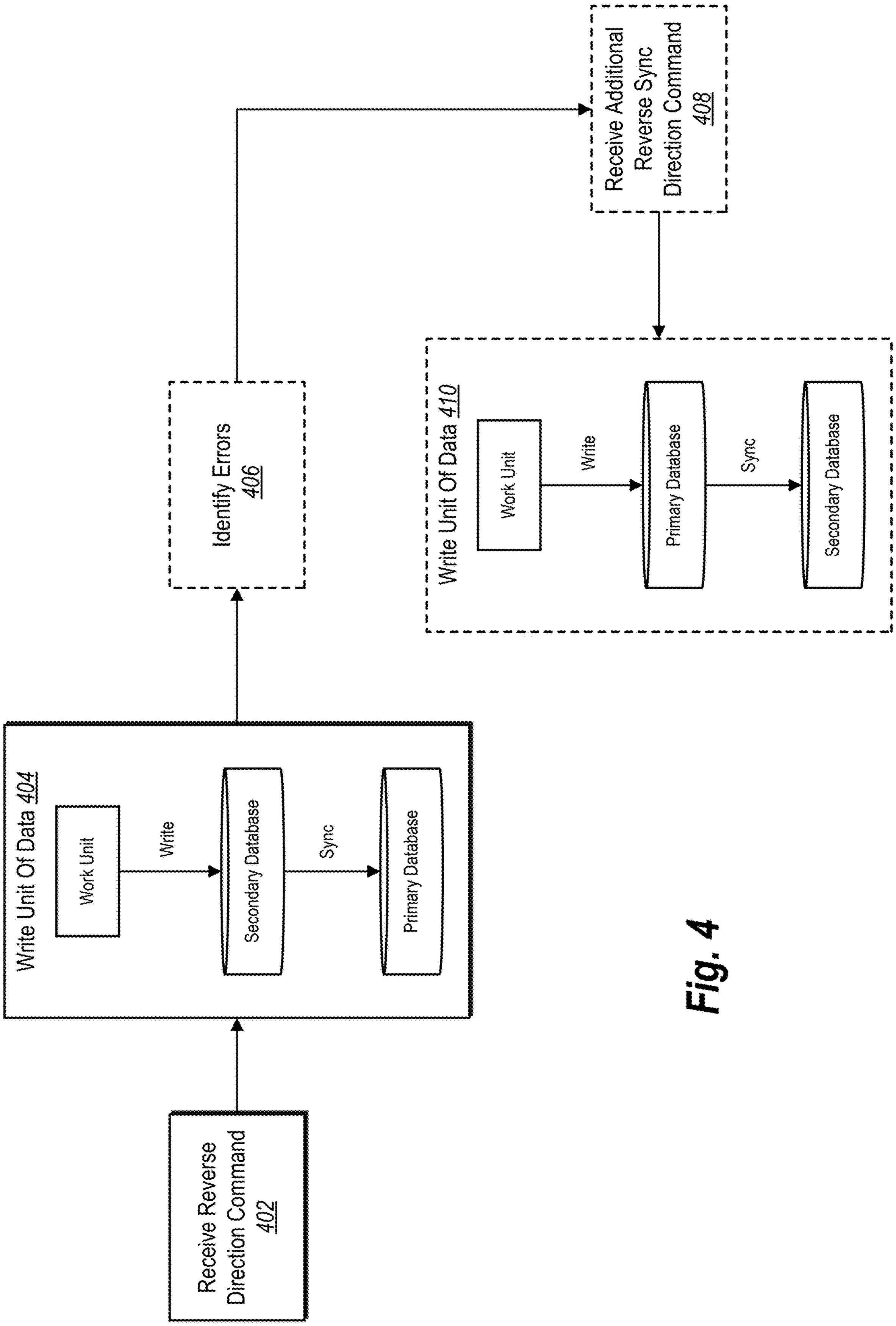
FIG. 4 illustrates an example diagram for a double-write database migration system changing sync direction after identifying errors in accordance with one or more embodiments.

As previously mentioned, the double-write database migration system 102 can change a sync direction that was previously changed to a reverse sync direction back to an initial sync direction. In particular, the double-write database migration system 102 can change a sync direction from a reversed sync direction back to an initial sync direction if the double-write database migration system 102 identifies errors. FIG. 4 illustrates an example diagram of the double-write database migration system 102 changing a sync direction after identifying errors in accordance with one or more embodiments.

As shown in FIG. 4, the double-write database migration system 102 receives reverse sync direction command 402. In particular, upon receiving reverse sync direction command 402, the double-write database migration system 102 writes units of data 404 by writing, to a secondary database and syncing, utilizing the sync record service 316, the unit of data to the primary database, as described in relation to FIGS. 3A-3B above.

As also illustrated in FIG. 4, the double-write database migration system 102 can identify errors 406. In particular, the double-write database migration system 102 can identify errors 406 when a database is used to recall data. For example, if the double-write database migration system 102 receives an indication that there was an error when one of the databases to which the double-write database migration system 102 is syncing data generates an error message. To illustrate, the double-write database migration system 102 can receive an error message based on an application (e.g., on a client device) attempting to use a database to which the double-write database migration system 102 is syncing fails to recall data.

Also, as illustrated, the double-write database migration system 102 can receive an additional reverse sync direction command 408. In particular, the double-write database migration system 102 can receive an additional reverse sync direction command 408 to change the sync direction. For example, additional reverse sync direction command 408 can instruct the double-write database migration system 102 to change the sync direction from a reversed sync direction back to an initial sync direction so that, upon receiving additional work units, the double-write database migration system 102 can write units of data to the primary database and sync, utilizing the sync record service, the unit of data to the secondary database.

As described above, the double-write database migration system 102 receives a reverse sync direction command and changes the sync direction for a client device or set of client devices. In some embodiments, the double-write database migration system 102 can identify errors when the client device attempts to utilize a database to which the double-write database migration system 102 is writing. For example, if the double-write database migration system 102 identifies errors for a client device that is in reversed sync direction, the double-write database migration system 102 can change the sync direction again, back to an initial sync direction. As illustrated in FIG. 4, after changing the sync direction back to an initial sync direction and upon receiving additional work units, the double-write database migration system 102 writes units of data to the primary database and syncs, utilizing the sync record service, the units of data to the secondary data.

In some embodiments, the double-write database migration system 102 receives additional reverse sync direction command 408 comprising instructions to change the sync direction to sync to a different database. In particular, additional reverse sync direction command 408 can comprise instructions for the double-write database migration system 102, upon receiving additional work units, to write to a further database. For example, additional reverse sync direction command 408 can comprise instructions for the double-write database migration system 102 to write to a database other than databases the double-write database migration system 102 wrote and/or synced prior to the additional reverse sync direction command. To illustrate, if the initial sync direction syncs from a primary database to a secondary database and a reverse sync direction command changes the sync direction to a reversed sync direction (e.g., from the secondary database to the primary database), additional reverse sync direction command 408 can comprise instructions for an additional sync direction (e.g., from the primary database to tertiary database).

Figure 5:
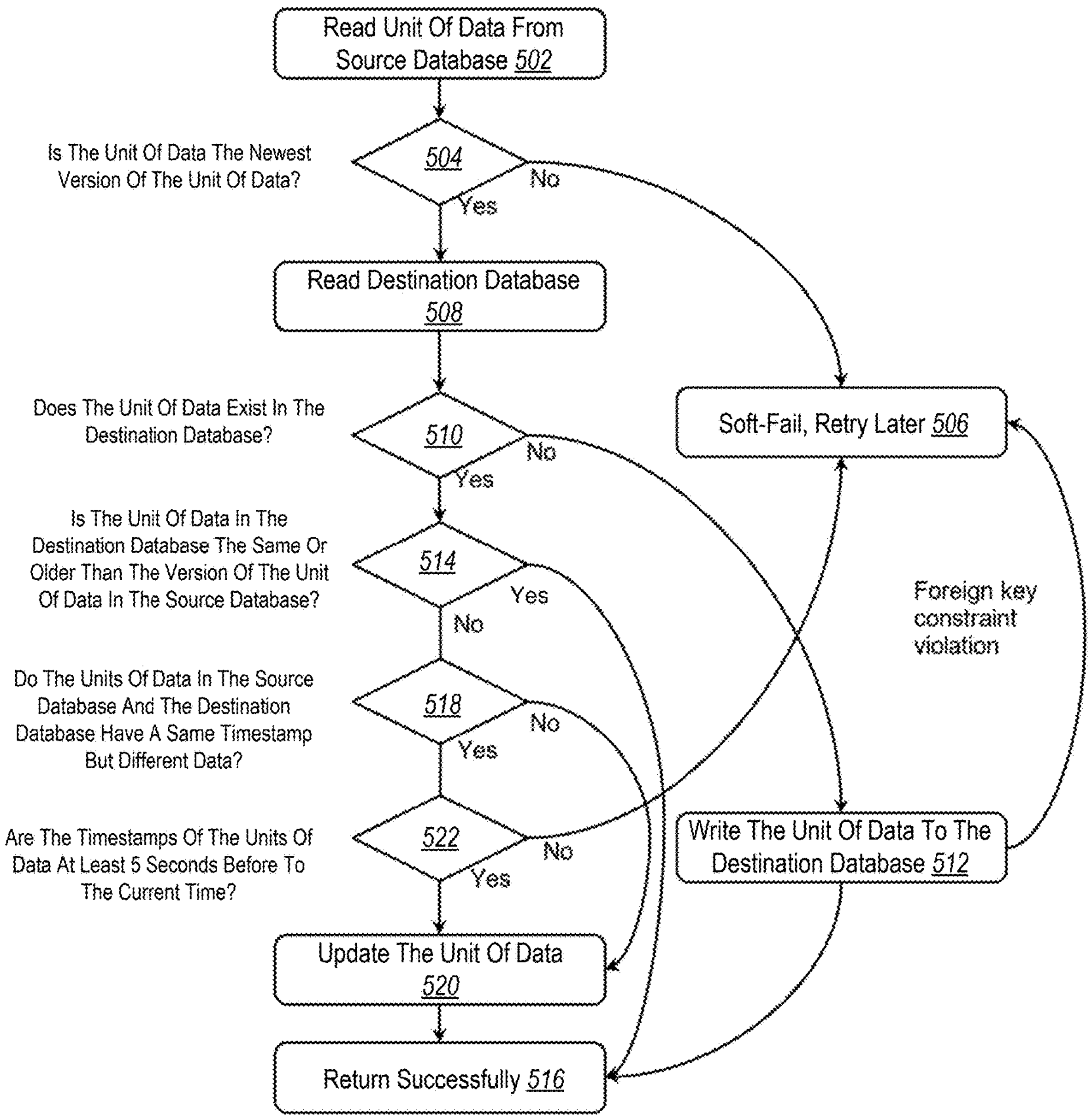
FIG. 5 illustrates an example diagram for a double-write database migration system determining whether to sync data in accordance with one or more embodiments.

As previously mentioned, the double-write database migration system 102 utilizes a timestamp associated to determine whether or not to sync to an additional database. In particular, the double-write database migration system 102 utilizes a timestamp associated with a unit of data to determine whether or not to asynchronously write data. FIG. 5 illustrates an example diagram for the double-write database migration system 102 determining whether to sync data in accordance with one or more embodiments. In some embodiments, the double-write database migration system 102 utilizes a time stamp associated with a unit of data to determine whether or not to sync the unit of data. In other embodiments, the double-write database migration system 102 utilizes the sync record service to determine whether or not to sync the unit of data based on timestamp.

As shown, the double-write database migration system 102 reads a unit of data from source database at step 502. In particular, the double-write database migration system 102 reads the data based on sync direction. For example, the double-write database migration system 102 reads data from the database to which it wrote the unit of data (e.g., after receiving a work unit). To illustrate, when syncing in an initial sync direction, the double-write database migration system 102 will read from the primary database. As another illustration, when syncing in a reversed sync direction, the double-write database migration system 102 will read from the secondary database.

After reading the unit of data from the source database, the double-write database migration system 102 can proceed to step 504 and determines whether the unit of data is the newest version of the unit of data. In particular, the double-write database migration system 102 utilizes a timestamp of the unit of data to determine whether the unit of data read in step 502 is the newest version of the unit of data. For example, if the double-write database migration system 102 determines that the version of the unit of data is not the newest version of the unit of data, then the double-write database migration system 102 determines not to write the unit of data and proceeds to step 506. If the double-write database migration system 102 determines that the version of the unit of data is the newest version of the unit of data, the double-write database migration system 102 proceeds to step 508.

If the double-write database migration system 102 determines not to write the unit of data at step 506, then the double-write database migration system 102 can determine to wait and repeat step 502. In particular, the double-write database migration system 102 can wait a threshold amount of time (e.g., five seconds) and proceed back to step 502. In particular, after the threshold amount of time, the double-write database migration system 102 can determine that the unit of data is the newest version of the unit of data based on an updated timestamp associated with the unit of data and proceed to step 508.

At step 508, the double-write database migration system 102 reads the destination database. In particular, the double-write database migration system 102 reads the destination database based on sync direction. For example, a destination database is a database to which the double-write database migration system 102, through the sync record service, asynchronously writes a unit of data. To illustrate, if the double-write database migration system 102 is in an initial sync direction, then the double-write database migration system 102 will read the destination database by reading the secondary database. As another illustration, if the double-write database migration system 102 is in a reversed sync direction, the double-write database migration system 102 will read the destination database by reading the primary database.

Further, when the double-write database migration system 102 reads the destination database at step 508, the double-write database migration system 102 determines whether the unit of data exists in the destination database. In particular, the double-write database migration system 102 can read a row in the destination database that corresponds to a row in the source database and determines whether the unit of data is in the destination database. If the unit of data does not exist in the destination database, then the double-write database migration system 102 can proceed to step 512 and write the unit of data to the destination database and then proceed to step 516 and return successfully. If the unit of data exists in the destination database, then the double-write database migration system 102 can proceed to step 514.

At step 514, the double-write database migration system 102 determines whether the unit of data in the destination database is the same or older than the version of the unit of data in the source database. If the double-write database migration system 102 determines, based on a timestamp associated with the unit of data, that the unit of data in the destination database is the same or older than the version of the unit of data in the source database, then the double-write database migration system 102 proceeds to step 514 and returns successfully. If the double-write database migration system 102 determines that the unit of data in the destination database is a newer version of the unit of data in the source database, then the double-write database migration system 102 proceeds to step 518.

At step 518, the double-write database migration system 102 determines whether the unit of data in the source database and the destination database have the same time-stamp but contain different data. If the double-write database migration system 102 determines that the units of data in the source database and the destination database have the same timestamp but different data, then then the double-write database migration system 102 proceeds to step 522. If the double-write database migration system 102 determines that the units of data in the source database and the destination database have a same timestamp but different data, then then the double-write database migration system 102 proceeds to step 506 and soft-fails (e.g., will wait a threshold time and then try again).

At step 522, the double-write database migration system 102 determines whether the timestamps of the units of data in the source database and the destination database are at least 5 seconds before the current time. If the double-write database migration system 102 determines that the time-stamps are not at least 5 seconds before the current time, then the double-write database migration system 102 proceeds to step 506 and soft-fails (e.g., to try again after a threshold amount of time). If the double-write database migration system 102 determines that the timestamps are at least 5 seconds before the current time, the double-write database migration system 102 proceeds to step 520 and updates the unit of data in the destination database, and then returns successfully. In some cases, even if the time stamps on the units of data are the same, the double-write database migration system 102 will proceed to step 520 and update the unit of data (e.g., assume that the unit of data in the source database is the most updated, even if the timestamps are the same).

Moreover, as shown in FIG. 5, the double-write database migration system 102 can identify if there is a foreign key constraint violation to a database outside the migration and soft-fail to retry later. While the double-write database migration system 102 can maintain foreign key relations to databases within the migration, the double-write database migration system 102 does not write foreign key relations to databases outside the migration. Hence if there are any foreign key relations, the write will fail, and the double-write database migration system 102 may try again at another time.

Figure 6A:
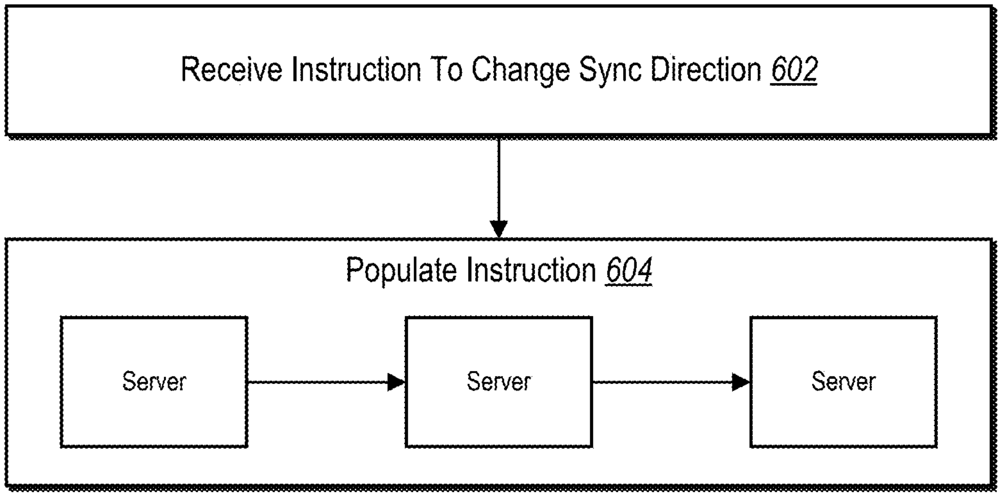
FIGS. 6A-6B illustrate example diagrams of a double-write database migration system reversing sync directions at varying times in accordance with one or more embodiments.
Figure 6B:
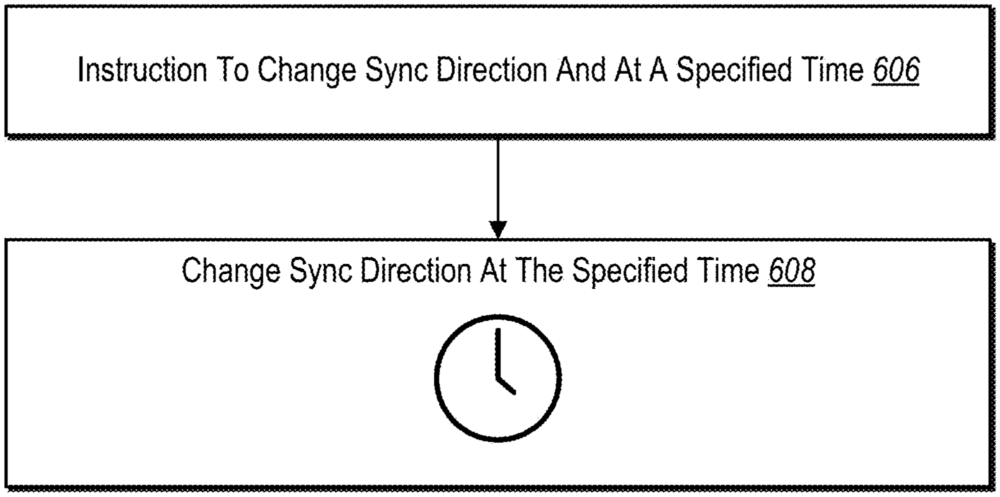

As previously mentioned, the double-write database migration system 102 can manage the timing of changing the sync direction to a reversed sync direction. In particular, the double-write database migration system 102 utilizes the reverse sync direction command to manage the timing of changing the sync direction to a reversed sync direction. FIGS. 6A-6B illustrate example diagrams of a double-write database migration system 102 reversing sync directions at varying times in accordance with one or more embodiments.

As shown in FIG. 6A, the double-write database migration system 102 receives an instruction to change sync direction 602. In particular, the double-write database migration system 102 receives an instruction to change sync direction 602 as part of a reverse sync direction command. For example, the reverse sync direction command comprises instructions that direct the double-write database migration system 102 to change the sync direction. In response to receiving the instruction to change sync direction, the double-write database migration system 102 populates instruction 604. For example, the double-write database migration system 102 populates the instruction through servers of a database system (e.g., by sending the instruction from server to server). To illustrate, as the double-write database migration system 102 populates instruction 604 to change sync direction, the double-write database migration system 102 changes sync direction for client devices as the server receives the instruction.

Depending on when a server receives the instruction, the double-write database migration system 102 can reverse the sync direction for client devices at varying times. In particular, until the instruction populates through all servers, some client devices will be in an initial sync direction, and other client devices will be in a reversed sync direction. For example, the double-write database migration system 102 can receive an instruction to change the sync direction to a reversed sync direction at a server associated with a first client device and change the sync direction for the first client device while maintaining the sync direction for a second client device (e.g., because the instruction has not yet reached a server associated with the client device). In some instances, the double-write database migration system 102 can receive work units from the first client device and the second client device that comprise conflicting data and/or conflicting timestamps and utilizes timestamps associated with the units of data to determine whether or not to write units of data to the additional database. However, because all users do not switch at the same time, there is a possibility that the double-write database migration system 102 may lose a small amount of data due to conflicting timestamps.

As shown in FIG. 6B, the double-write database migration system 102 receives an instruction to change the sync direction at a specified time 606. In particular, the double-write database migration system 102 receives instructions to change sync direction at a specified time 606 as part of a reverse sync direction command. For example, a reverse sync direction command can comprise instructions to change the sync direction to a change sync direction for a user, a set of users, or all users at a specified time. The double-write database migration system 102 then proceeds to change sync direction at the specified time 608. By changing the sync direction for users at a specified time, the double-write database migration system 102 can avoid losing data due to conflicting timestamps.

Figure 7:
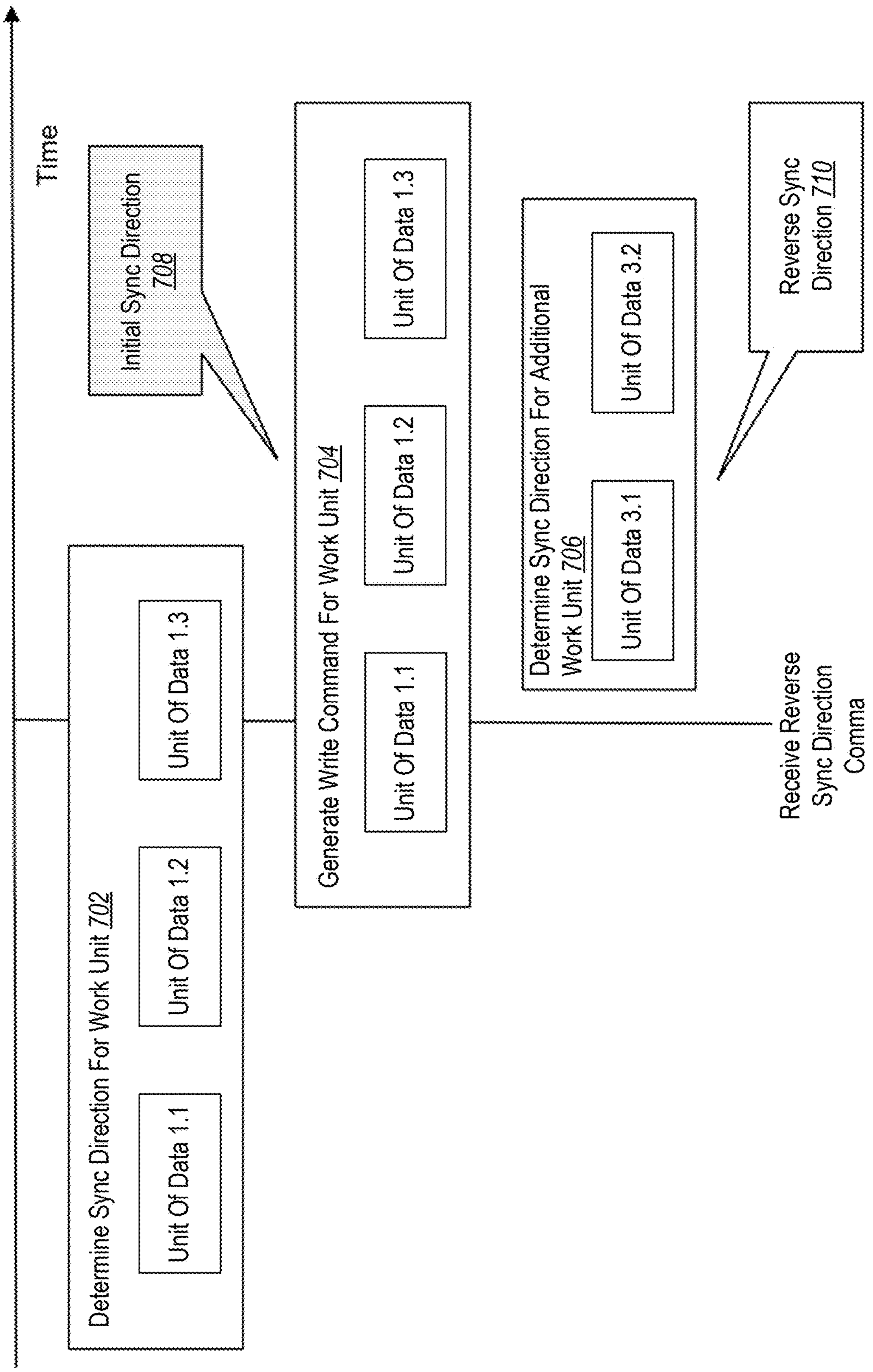
FIG. 7 illustrates an example timeline for a double-write database migration system generating a write command for a work unit based on sync direction in accordance with one or more embodiments.

In some embodiments, the double-write database migration system 102 writes a work unit in the sync direction designated when beginning to write units of data in the work unit to the primary database. In particular, before generating a write command for a work unit, the double-write database migration system 102 identifies a sync direction for a work unit and generates the write command based on the identified sync direction. FIG. 7 illustrates an example timeline for a double-write database migration system generating a write command for a work unit based on sync direction in accordance with one or more embodiments.

As shown in FIG. 7, the double-write database migration system 102 determines a sync direction for work unit 702. In particular, before generating a write command of units of data in the work unit, the double-write database migration system 102 utilizes a switch to determine a sync direction for the write command. For example, double-write database migration system 102 can utilize the switch to determine which database to write units of data in the work unit and generate a write command for the work unit for that database. To illustrate, if the switch indicates that the sync direction is a reversed sync direction, the double-write database migration system 102 will generate a write command to write units of data in a work unit to a secondary database.

As previously mentioned, the double-write database migration system 102 can write data based on a sync direction for a client device. In some embodiments, the double-write database migration system 102 utilizes a switch to determine a sync direction for a work unit based on a sync direction for a client device. In particular, the switch can identify a sync direction for a client device based on whether a client identification associated with the client device indicates an initial sync direction or a reversed sync direction. For example, the double-write database migration system 102 will utilize a switch to determine a sync direction for a work unit comprising units of data associated with a client device based on a sync direction indicated by the client identification associated with the client device.

In some embodiments, the double-write database migration system 102 generates the write command 704 for the work unit according to the sync direction indicated by the switch. In particular, the double-write database migration system 102 writes the unit of data according to the generated write command, even if the double-write database migration system 102 receives a reverse sync direction command. For example, as illustrated, if the double-write database migration system 102 receives a reverse sync direction command while writing units of data in the work unit, the double-write database migration system 102 will continue to write the units of data in the initial sync direction 708 of the generated write command and not according to the reverse sync direction command.

As shown, in one or more embodiments, the double-write database migration system 102 determines a sync direction for additional work units 706. In particular, the double-write database migration system 102 can utilize a switch to determine a sync direction for a work unit received even if a previous work unit indicated a certain sync direction. For example, as shown, the double-write database migration system 102 determines a sync direction for the additional work unit and identifies that the sync direction is now a reversed sync direction 710 because the double-write database migration system 102 received a reverse sync direction command. Further, in some embodiments, double-write database migration system 102 determines sync direction for additional work units before generating a write command of units of data in the work unit even if the work units are both associated with the same client device (e.g., based on client identification).

Figure 8:
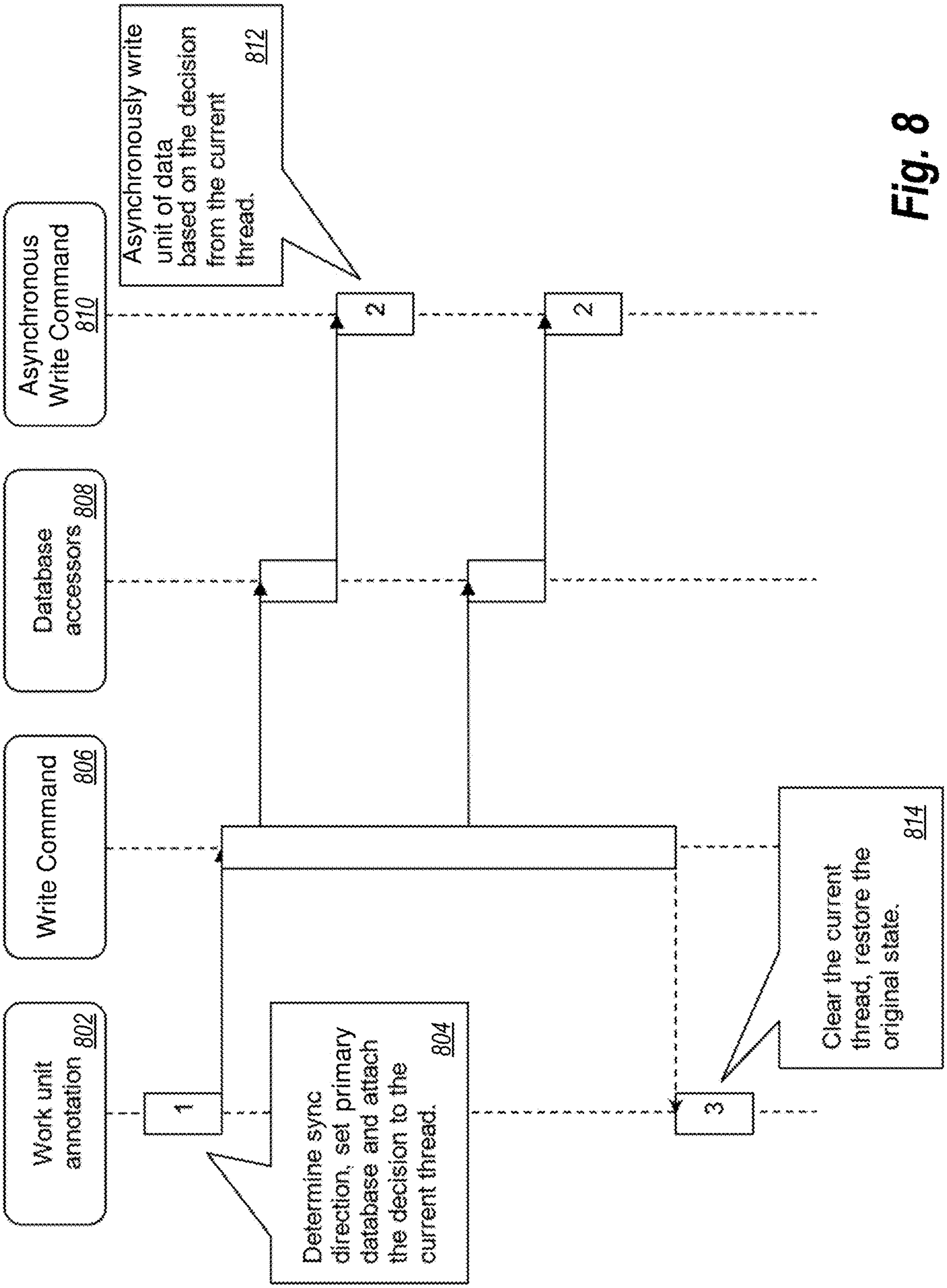
FIG. 8 illustrates an example flowchart of a double-write database migration system annotating units of work in accordance with one or more embodiments.

In one or more embodiments, the double-write database migration system 102 annotates a work unit when generating a write command of units of data in the work unit. In particular, the double-write database migration system 102 annotates the work unit to indicate a sync direction associated with the work unit. FIG. 8 illustrates an example flowchart of a double-write database migration system annotating units of work in accordance with one or more embodiments.

As previously mentioned, the double-write database migration system 102 determines a sync direction for a work unit prior to generating a write command for units of data in the work unit. In particular, the double-write database migration system 102 can annotate the work unit to indicate a sync direction for writing units of data in the work unit and a database to which a write command will write. For example, as illustrated in box 804, the double-write database migration system 102 determines a sync direction, sets a database by determining a database to which a write command will write, and attaches the decision of which database to write to a current thread.

In some embodiments, the double-write database migration system wraps the sync direction determination and an indication of the primary database into an object and attaches the object to a current thread. In particular, the object utilizes annotation code that identifies to which database write command 808 writes. For example, if the double-write database migration system 102 is in an initial sync direction, the annotation code can identify that write command 806 should write to the primary database. In addition, if the double-write database migration system 102 is in a reversed sync direction, the annotation code can identify that write command 806 should write to the secondary database.

As previously mentioned, the double-write database migration system 102 can utilize a trigger to generate an asynchronous write command of a unit of data. In some embodiments, when the asynchronous write command is triggered, the double-write database migration system 102 grabs the object attached to the current thread. In particular, the double-write database migration system 102 grabs the object from the current thread and utilizes the object to instruct the sync record service to which database a write command should write. For example, the double-write database migration system 102 can set parameters to pass when it schedules an asynchronous write command with the sync record service.

The double-write database migration system 102 can also clear the current thread and restores the original state. In particular, the double-write database migration system 102 clears the thread after writing all units of data in a work unit. For example, the double-write database migration system 102 can clear all the threads so that, upon receiving an additional work unit, the double-write database migration system 102 can determine a new sync direction, as further described above in relation to FIG. 8.

Figure 9:
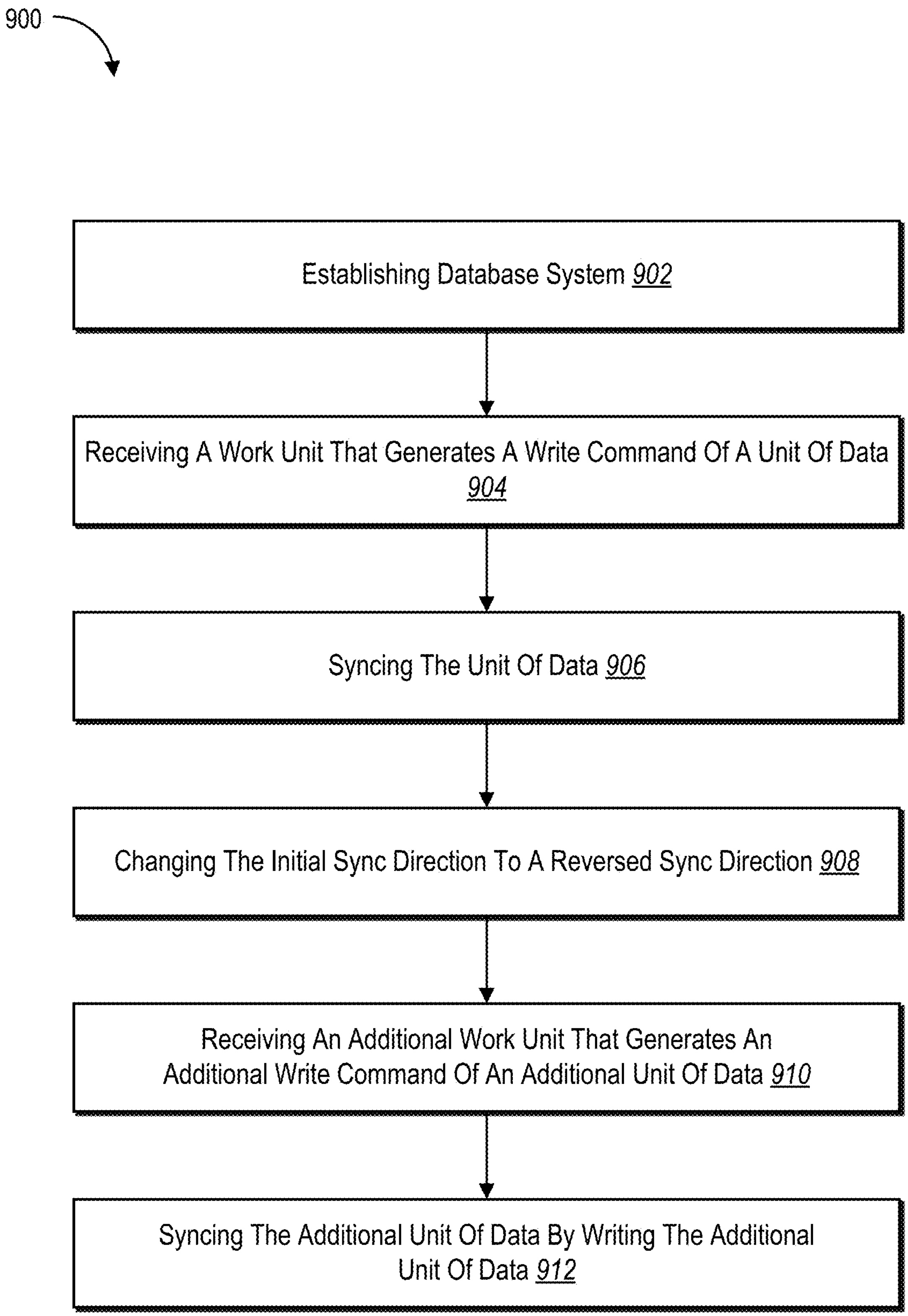
FIG. 9 illustrates an example series of acts for using a database migration system in accordance with one or more embodiments.

FIGS. 1-8, the corresponding text, and the examples provide a number of different methods, systems, devices, and non-transitory computer-readable media of the double-write database migration system 102. In addition to the foregoing, one or more embodiments can also be described in terms of flowcharts comprising acts for accomplishing a particular result, as shown in FIG. 9. FIG. 9 may be performed with more or fewer acts. Further, the acts may be performed in differing orders. Additionally, the acts described herein may be repeated or performed in parallel with one another or parallel with different instances of the same or similar acts.

As mentioned, FIG. 9 illustrates a flowchart of a series of acts 900 for migrating data by asynchronously writing data from a primary database to a secondary database in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown in FIG. 9, the series of acts 900 includes an act 902 of establishing a database system, an act 904 of receiving a work unit that generates a write command of a unit of data, an act 906 of syncing the unit of data, an act of changing the initial sync direction to a reversed sync direction, an act 910 of receiving an additional work unit that generates an additional write command of an initial unit of data, and an act 912 of syncing the additional unit of data to by writing the additional unit of data.

In particular, the act 902 can include establishing a database system comprising a primary database that hosts a plurality of data tables, wherein the database system comprises an initial sync direction between a first data table in the primary database and a second data table in a secondary database, the act 904 can include receiving a work unit that generates a write command of a unit of data to the first data table in the primary database, wherein receiving the work unit generates a trigger to schedule, with a sync record service, an asynchronous write command of the unit of data to the second data table in a secondary database based on the initial sync direction, the act 906 can include writing, by the sync record service, the unit of data to second data table in the secondary database based on the scheduled asynchronous write command causing the unit of data to be synchronized between the first data table in the primary database and the second data table in the secondary database, the act 908 can include changing the initial sync direction to a reversed sync direction based on receiving a reverse sync direction command, the act 910 can include receiving an additional work unit that generates an additional write command of an additional unit of data to the second data table in the secondary database, wherein receiving the additional work unit generates an additional trigger to schedule, with the sync record service, an additional asynchronous write command of the additional unit of data to the first data table in the primary database based on the reversed sync direction, and the act 912 can include writing, by the sync record service, the additional unit of data to the primary database based on the scheduled additional asynchronous write command causing the unit of data to be synchronized between the second data table in the secondary database and the first data table in the primary database.

For example, in one or more embodiments, the series of acts 900 includes modifying the database system by removing a command to generate triggers to schedule, with the sync record service, asynchronous write commands when receiving work units and receiving a further work unit that generates a further write command of a further unit of data to the second data table in the secondary database.

Additionally, in one or more embodiments, the series of acts 900 includes changing the initial sync direction to the reversed sync direction for a first client device associated with a first user identification based on receiving the reverse sync direction command for the first client device and receiving the additional work unit from the first client device that generates the additional write command of the additional unit of data to the second data table in the secondary database, wherein receiving the additional work unit from the first client device generates the additional trigger to schedule, with the sync record service, the additional asynchronous write command of the additional unit of data to the first data table in the primary database based on the reversed sync direction for the first client device. Moreover, in one or more embodiments, the series of acts 900 includes identifying an error with the secondary database based on utilizing the secondary database to recall data and changing, based on receiving an additional reverse sync direction command for the first client device, the reversed sync direction to the initial sync direction.

Moreover, in one or more embodiments, the series of acts 900 includes determining, based on a timestamp associated with the unit of data in the first data table in the primary database, whether the unit of data in the first data table in the primary database is a newest version of the unit of data and based on determining that the unit of data in the first data table in the primary database is the newest version of the unit of data, writing, by the sync record service, the unit of data to the secondary database.

In addition, in one or more embodiments, the series of acts 900 includes writing, by the sync record service, the unit of data to the secondary database based on the scheduled asynchronous write command by identifying, based on a timestamp associated with the unit of data in the first data table in the primary database, that the unit of data in the first data table in the primary database is an older version of the unit of data, determining to not write the unit of data to the second data table in the secondary database, identifying, after a threshold amount of time and based on an updated timestamp associated with the unit of data in the first data table in the primary database, that the unit of data in the first data table in the primary database is an updated version of the unit of data, and writing, by the sync record service, the unit of data to the second data table in the secondary database.

Further, in one or more embodiments, the series of acts 900 includes identifying units of data in the first data table in the primary database comprising a timestamp older than the unit of data, identifying that the units of data in the first data table in the primary database comprising a time stamp older than the unit of data are not in the second data table in the secondary database, and backfilling the second data table in the secondary database by writing the units of data that comprise a timestamp older than the unit of data from the first data table in the primary database to the second data table in the secondary database.

Also, in one or more embodiments, the series of acts 900 includes receiving a reverse sync direction command by receiving, from a server of the database system, an instruction to change the initial sync direction to the reversed sync direction for a set of client devices and based on receiving the instruction, changing the initial sync direction to the reversed sync direction for the set of client devices.

Additionally, in one or more embodiments, the series of acts 900 includes receiving a reverse sync direction command by receiving, from a server of the database system, an instruction to change the initial sync direction to the reversed sync direction for a set of client devices at a specified time and changing the initial sync direction to the reversed sync direction for the set of client devices at the specified time.

Moreover, in one or more embodiments, the series of acts 900 includes receiving a reverse sync direction command by receiving an instruction to utilize a switch to change the initial sync direction to a reversed sync direction.

Figure 10:
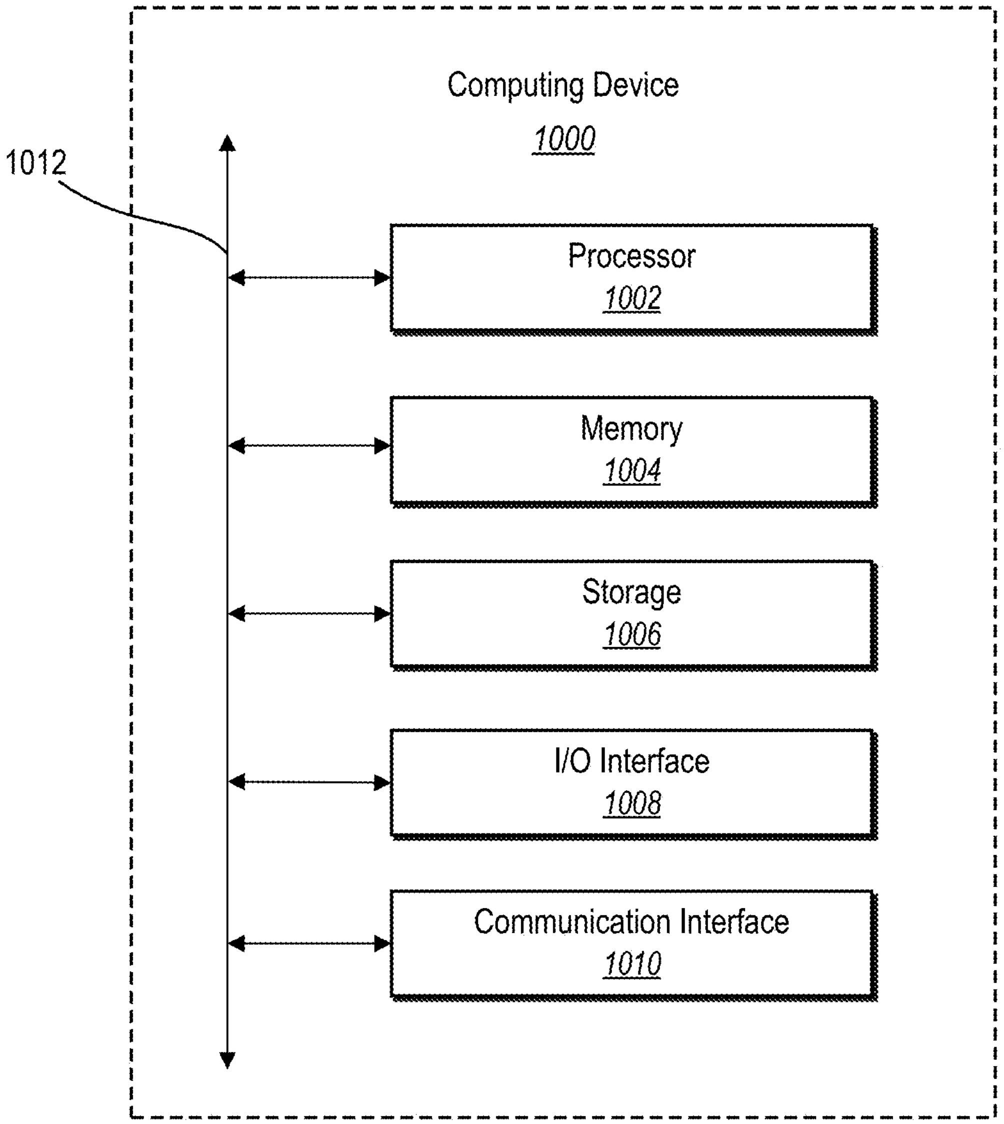
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., computing device 1000, server(s) 106, client device(s) 110*a*-110*n*). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 812). While the computing device 1000 is shown in FIG. 8, the components illustrated in FIG. 8 are not intended to be limiting. Additional or alternative components may be used in other embodiments. Furthermore, in certain embodiments, the computing device 1000 includes fewer components than those shown in FIG. 8. Components of the computing device 1000 shown in FIG. 8 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 812. The bus 812 can include hardware, software, or both that connects components of computing device 1000 to each other.

Figure 11:
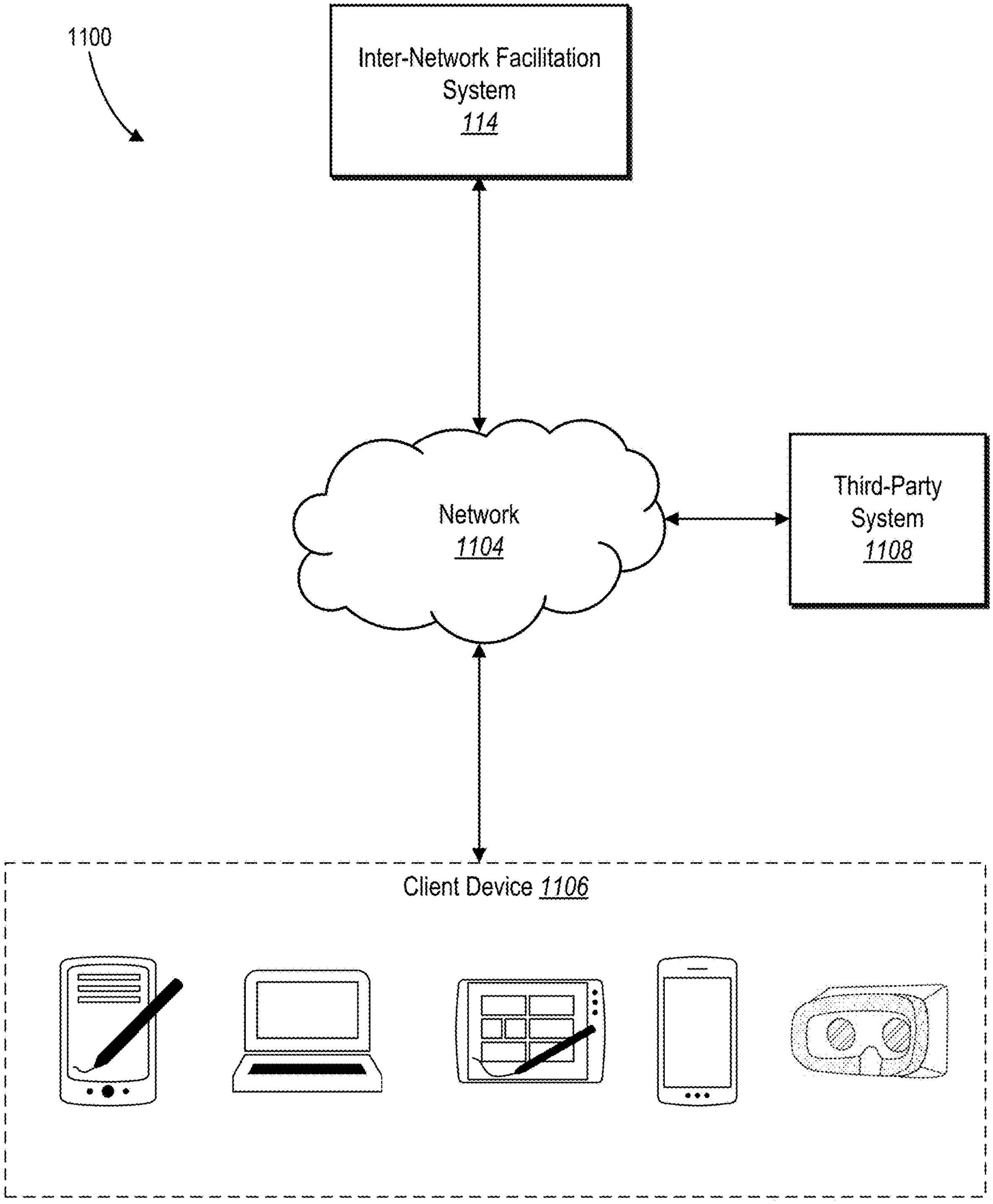
FIG. 11 illustrates an example environment for an inter-network facilitation system in accordance with one or more embodiments.

FIG. 11 illustrates an example network environment 1100 of the inter-network facilitation system 104. The network environment 1100 includes a client device 1106 (e.g., the client devices 110*a*-110*c*), an inter-network facilitation system 104, and a third-party system 1108 connected to each other by a network 1104. Although FIG. 9 illustrates a particular arrangement of the client device 1106, the inter-network facilitation system 104, the third-party system 1108, and the network 1104, this disclosure contemplates any suitable arrangement of client device 1106, the inter-network facilitation system 104, the third-party system 1108, and the network 1104. As an example, and not by way of limitation, two or more of client device 1106, the inter-network facilitation system 104, and the third-party system 1108 communicate directly, bypassing network 1104. As another example, two or more of client device 1106, the inter-network facilitation system 104, and the third-party system 1108 may be physically or logically co-located with each other in whole or in part.

Moreover, although FIG. 9 illustrates a particular number of client devices 1106, inter-network facilitation systems 104, third-party systems 1108, and networks 1104, this disclosure contemplates any suitable number of client devices 1106, inter-network facilitation system 104, third-party systems 1108, and networks 1104. As an example, and not by way of limitation, network environment 1100 may include multiple client device 1106, inter-network facilitation system 104, third-party systems 1108, and/or networks 1104.

This disclosure contemplates any suitable network 1104. As an example, and not by way of limitation, one or more portions of network 1104 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1104 may include one or more networks 1104.

Links may connect client device 1106 and third-party system 1108 to network 1104 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, the client device 1106 may be an electronic device including hardware, software, or embedded logic components or a combination of two or more such components and capable of carrying out the appropriate functionalities implemented or supported by client device 1106. As an example, and not by way of limitation, a client device 1106 may include any of the computing devices discussed above in relation to FIG. 8. A client device 1106 may enable a network user at the client device 1106 to access network 1104. A client device 1106 may enable its user to communicate with other users at other client devices 1106.

In particular embodiments, the client device 1106 may include a requester application or a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at the client device 1106 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1106 one or more Hyper Text Markup Language ("HTML") files responsive to the HTTP request. The client device 1106 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 1104) to link the third-party system 1108. For example, the inter-network facilitation system 104 may receive authentication credentials from a user to link a third-party system 1108 such as an online bank account, credit account, debit account, or other financial account to a user account within the inter-network facilitation system 104. The inter-network facilitation system 104 can subsequently communicate with the third-party system 1108 to detect or identify balances, transactions, withdrawal, transfers, deposits, credits, debits, or other transaction types associated with the third-party system 1108. The inter-network facilitation system 104 can further provide the aforementioned or other financial information associated with the third-party system 1108 for display via the client device 1106. In some cases, the inter-network facilitation system 104 links more than one third-party system 1108, receiving account information for accounts associated with each respective third-party system 1108 and performing operations or transactions between the different systems via authorized network connections.

In particular embodiments, the inter-network facilitation system 104 may interface between an online banking system and a credit processing system via the network 1104. For example, the inter-network facilitation system 104 can provide access to a bank account of a third-party system 1108 and linked to a user account within the inter-network facilitation system 104. Indeed, the inter-network facilitation system 104 can facilitate access to, and transactions to and from, the bank account of the third-party system 1108 via a client application of the inter-network facilitation system 104 on the client device 1106. The inter-network facilitation system 104 can also communicate with a credit processing system, an ATM system, and/or other financial systems (e.g., via the network 1104) to authorize and process credit charges to a credit account, perform ATM transactions, perform transfers (or other transactions) across accounts of different third-party systems 1108, and to present corresponding information via the client device 1106.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 1108), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 1100 either directly or via network 1104. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1106, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 1104.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 1106. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 1106. Information may be pushed to a client device 1106 as notifications, or information may be pulled from client device 1106 responsive to a request received from client device 1106. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 1106 associated with users.

In addition, the third-party system 1108 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 1104. A third-party system 1108 can communicate with the inter-network facilitation system 104 to provide financial information pertaining to balances, transactions, and other information, whereupon the inter-network facilitation system 104 can provide corresponding information for display via the client device 1106. In particular embodiments, a third-party system 1108 communicates with the inter-network facilitation system 104 to update account balances, transaction histories, credit usage, and other internal information of the inter-network facilitation system 104 and/or the third-party system 1108 based on user interaction with the inter-network facilitation system 104 (e.g., via the client device 1106). Indeed, the inter-network facilitation system 104 can synchronize information across one or more third-party systems 1108 to reflect accurate account information (e.g., balances, transactions, etc.) across one or more networked systems, including instances where a transaction (e.g., a transfer) from one third-party system 1108 affects another third-party system 1108.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

based on receiving a write command of a unit of data from a data source:

writing the unit of data to a first data table in a primary database based on a first sync direction;

generating an asynchronous write command trigger for a secondary database based on the first sync direction; and scheduling an asynchronous write command of the unit of data from the first data table to a second data table in the secondary database based on the asynchronous write command trigger;

changing the first sync direction to a second sync direction to configure direct writing of the data from the data source to the second data table and the asynchronous writing of the data to the first data table; and based on receiving an additional write command of an additional unit of data from the data source:

writing the additional unit of data to the second data table in the secondary database based on the second sync direction;

generating an additional asynchronous write command trigger for the primary database based on the second sync direction; and scheduling an additional asynchronous write command of the additional unit of data to the first data table in the primary database based on the additional asynchronous write command trigger.

2. The computer-implemented method of claim 1, further comprising removing a trigger to schedule asynchronous write commands when receiving work units.

3. The computer-implemented method of claim 1, further comprising changing the first sync direction to the second sync direction for the data source comprising a first client device associated with a first user identification based on receiving a second sync direction command from the first client device.

4. The computer-implemented method of claim 3, further comprising:

after changing the first sync direction to a second sync direction, detecting a write-error within the secondary database based on utilizing the secondary database to recall data; and changing, based on detecting the write-error, the second sync direction back to the first sync direction.

5. The computer-implemented method of claim 1, further comprising:

determining the unit of data in the first data table in the primary database is a newest version of the unit of data based on timestamp data associated with the unit of data; and based on determining that the unit of data in the first data table in the primary database is the newest version of the unit of data, writing, via the asynchronous write command, the unit of data to the second data table in the secondary database.

6. The computer-implemented method of claim 1, further comprising:

determining the unit of data in the first data table in the primary database is an older version of the unit of data based on timestamp data associated with the unit of data; and determining to not write the unit of data to the second data table in the secondary database based on the unit of data being the older version of the unit of data.

7. The computer-implemented method of claim 1, further comprising:

identifying units of data in the first data table in the primary database comprising a timestamp older than the unit of data;

identifying that the units of data in the first data table in the primary database comprising a time stamp older than the unit of data are not in the second data table in the secondary database; and backfilling the second data table in the secondary database by writing the units of data that comprise a timestamp older than the unit of data from the first data table in the primary database to the second data table in the secondary database.

8. A non-transitory computer-readable medium storing instructions that, when executed by at least one processor, cause a computer system to:

based on receiving a write command of a unit of data from a data source:

write the unit of data to a first data table in a primary database based on a first sync direction;

generate an asynchronous write command trigger for a secondary database based on the first sync direction; and schedule an asynchronous write command of the unit of data from the first data table to a second data table in the secondary database based on the asynchronous write command trigger;

change the first sync direction to a second sync direction to configure direct writing of the data from the data source to the second data table and the asynchronous writing of the data to the first data table; and based on receiving an additional write command of an additional unit of data from the data source:

write the additional unit of data to the second data table in the secondary database based on the second sync direction;

generate an additional asynchronous write command trigger for the primary database based on the second sync direction; and schedule an additional asynchronous write command of the additional unit of data to the first data table in the primary database based on the additional asynchronous write command trigger.

9. The non-transitory computer-readable medium of claim 8, further comprising instructions that, when executed by the at least one processor, cause the computer system to remove a trigger to schedule asynchronous write commands when receiving work units.

10. The non-transitory computer-readable medium of claim 8, further comprising instructions that, when executed by the at least one processor, cause the computer system to change the first sync direction to the second sync direction for the data source comprising a first client device associated with a first user identification based on receiving a second sync direction command from the first client device.

11. The non-transitory computer-readable medium of claim 8, further comprising instructions that, when executed by the at least one processor, cause the computer system to:

after changing the first sync direction to a second sync direction, detect a write-error within the secondary database based on utilizing the secondary database to recall data; and change, based on detecting the write-error, the second sync direction back to the first sync direction.

12. The non-transitory computer-readable medium of claim 8, further comprising instructions that, when executed by the at least one processor, cause the computer system to:

determine the unit of data in the first data table in the primary database is a newest version of the unit of data based on timestamp data associated with the unit of data; and based on determining that the unit of data in the first data table in the primary database is the newest version of the unit of data, write, via the asynchronous write command, the unit of data to the second data table in the secondary database.

13. The non-transitory computer-readable medium of claim 8, further comprising instructions that, when executed by the at least one processor, cause the computer system to:

determine the unit of data in the first data table in the primary database is an older version of the unit of data based on timestamp data associated with the unit of data; and determine to not write the unit of data to the second data table in the secondary database based on the unit of data being the older version of the unit of data.

14. The non-transitory computer-readable medium of claim 8, further comprising instructions that, when executed by the at least one processor, cause the computer system to:

identify units of data in the first data table in the primary database comprising a timestamp older than the unit of data;

identify that the units of data in the first data table in the primary database comprising a time stamp older than the unit of data are not in the second data table in the secondary database; and backfill the second data table in the secondary database by writing the units of data that comprise a timestamp older than the unit of data from the first data table in the primary database to the second data table in the secondary database.

15. A system comprising:

at least one processor; and at least one non-transitory computer-readable storage medium storing instructions that, when executed by the at least one processor, cause the system to:

based on receiving a write command of a unit of data from a data source:

write the unit of data to a first data table in a primary database based on a first sync direction;

generate an asynchronous write command trigger for a secondary database based on the first sync direction; and schedule an asynchronous write command of the unit of data from the first data table to a second data table in the secondary database based on the asynchronous write command trigger;

change the first sync direction to a second sync direction to configure direct writing of the data from the data source to the second data table and the asynchronous writing of the data to the first data table; and based on receiving an additional write command of an additional unit of data from the data source:

write the additional unit of data to the second data table in the secondary database based on the second sync direction;

generate an additional asynchronous write command trigger for the primary database based on the second sync direction; and schedule an additional asynchronous write command of the additional unit of data to the first data table in the primary database based on the additional asynchronous write command trigger.

16. The system of claim 15, further comprising instructions that, when executed by the at least one processor, cause the system to remove a trigger to schedule asynchronous write commands when receiving work units.

17. The system of claim 15, further comprising instructions that, when executed by the at least one processor, cause the system to change the first sync direction to the second sync direction for the data source comprising a first client device associated with a first user identification based on receiving a second sync direction command from the first client device.

18. The system of claim 15, further comprising instructions that, when executed by the at least one processor, cause the system to:

after changing the first sync direction to a second sync direction, detect a write-error within the secondary database based on utilizing the secondary database to recall data; and change, based on detecting the write-error, the second sync direction back to the first sync direction.

19. The system of claim 15, further comprising instructions that, when executed by the at least one processor, cause the system to:

determine the unit of data in the first data table in the primary database is a newest version of the unit of data based on timestamp data associated with the unit of data; and based on determining that the unit of data in the first data table in the primary database is the newest version of the unit of data, write, via the asynchronous write command, the unit of data to the second data table in the secondary database.

20. The system of claim 15, further comprising instructions that, when executed by the at least one processor, cause the system to:

identify units of data in the first data table in the primary database comprising a timestamp older than the unit of data;

identify that the units of data in the first data table in the primary database comprising a time stamp older than the unit of data are not in the second data table in the secondary database; and backfill the second data table in the secondary database by writing the units of data that comprise a timestamp older than the unit of data from the first data table in the primary database to the second data table in the secondary database.

* * * * *